Nov. 14, 1933.  H. S. HOLMES  1,934,853
METHOD OF MAKING PIPE
Filed Jan. 31, 1929
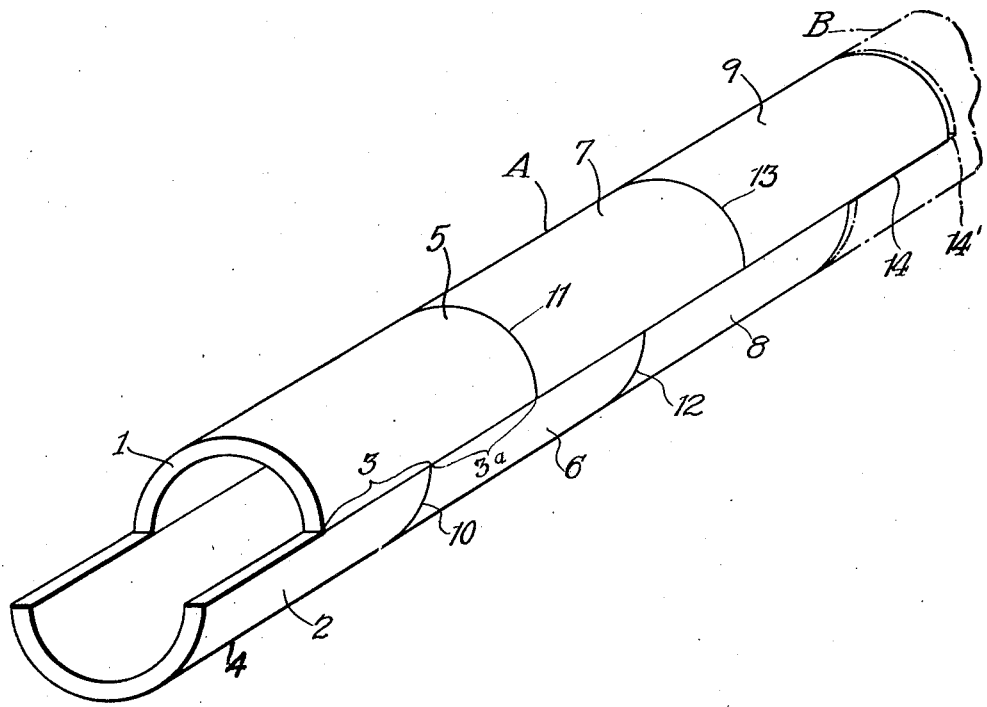
Inventor
HENRY S. HOLMES.
By his Attorneys Patented Nov. 14, 1933

1,934,853

UNITED STATES PATENT OFFICE

1,934,853

METHOD OF MAKING PIPE

Henry S. Holmes, New York, N. Y., assignor, by mesne assignments, to Metropolitan Engineering Company, Brooklyn, N. Y., a corporation of New York Application January 31, 1929. Serial No. 336,402

4 Claims. (Cl. 219—10)

My invention relates to welded pipe and hollow objects and to a method of forming the same by welding and more particularly to a method by which pipe and hollow objects are formed by welding on longitudinal seams by means of electric resistance welding.

The length of a seam that may be made by electric resistance welding at one time is limited by the capacity of the welding machine, since the entire length of the seam to be joined must be brought to the welding temperature and welded in a single operation. In an application of Thomas E. Murray, Serial No. 633,407, a method is described in which the limitation on the length of the longitudinal seam is avoided by dividing one part of the hollow object into a number of sections which are separately welded on their longitudinal edges into a continuously extending length of hollow object, the lengths of each section being within the capacity of the welding machine.

Among the objects of my present invention are to provide a welded construction for pipe and hollow objects in which sections having longitudinal edges longer than the welding capacity of a welding machine may be welded to form any desired length of pipe or other hollow object, and to enable such a pipe or hollow object to be formed of sections of uniform dimensions.

With these and other objects in view, the invention comprises a pipe construction and the method of forming electrically welded pipe described and set forth in the following specification and claims.

The invention is illustrated in the accompanying drawing which shows a perspective view of a pipe construction embodying a preferred form of the invention.

In the embodiment of the invention shown in the accompanying drawing, relatively short segmental sections 1 and 2, semi-cylindrical sections being shown, are positioned in complementary or opposed relation with their longitudinal edges abutting and offset longitudinally, relatively to each other and are then welded together at the abutting edges 3 by electric resistance welding. The length of the sections is made in accordance with the capacity of the welding machine to weld the sections on the length of the abutment. A complete hollow section is thus formed throughout the common or abutting length 3, with projecting portions 4 and 5 at opposite ends and on diametrically opposite sides of the axis of the pipe section.

A third semi-cylindrical section 6 is placed in position with its longitudinal edges abutting at 3a, the edges of 5, and the abutting longitudinal edges of sections 6 are then welded by electric resistance welding, thereby extending the length of the completed pipe and forming a new length of longitudinally projecting edges to which an additional section may be welded. In this manner a pipe or other hollow article of any desired length may be formed, a length of six semi-cylindrical sections being shown by way of example, formed by the addition of sections 7, 8 and 9 to the projecting portion of the section 6.

Transverse seams 10, 11, 12 and 13 are thus left between the end edges of the semi-cylindrical sections. These seams are closed and the abutting ends of adjacent sections joined by arc or gas welding which supplies the necessary metal to close any spaces between the abutting edges.

For convenience in laying a pipe line, a number of semi-cylindrical sections may be joined into convenient lengths in this manner and these lengths transported and laid in position in a line with the projecting end of one length in a line oppositely projecting end of an adjacent length. As indicated in the drawing for example, the longitudinally projecting edges 14 of the semi-cylindrical section 9 of length A may fit the longitudinally projecting edges 14' of a following length B, and with the transverse edges abutting in a pair of offset or broken seams. The lengths are then welded along the longitudinal and transverse seams by arc or gas welding.

In the above described construction it will be obvious that the length of the sections 1, 2, 6, 7, 8 and 9 may be made twice the length of a seam that it is within the capacity of the welding machine to weld, inasmuch as only one-half of the length of each section is welded at one welding operation. From a number of sections of standard dimensions a length of pipe or tubing, or other hollow object, of any desired length may be formed.

As changes of construction could be made within the scope of my invention, it is intended that all matter contained in the above description or shown in the accompanying drawing shall be interpreted as illustrative and not in a limiting sense.

What I claim is:

1. A method of forming hollow articles which comprises positioning hollow segments in complementarily opposed and longitudinally offset relation, and successively resistance welding the segments together at their opposed longitudinal edges in a single operation throughout the length of the overlap of the segments.

2. A method of forming hollow articles which comprises positioning hollow segments in complementarily opposed and longitudinally offset relation, and welding the segments together at their opposed longitudinal edges by electric resistance butt welding.

3. A method of forming pipe which comprises positioning successive semi-cylindrical pipe sections in complementarily opposed, longitudinally offset relation to each other, welding said sections on their longitudinal joints by electric resistance butt welding, and welding the transverse joints by autogenous welding.

4. A method of laying a line of pipe which comprises forming lengths of pipe having semi-cylindrical sections at opposite ends, positioning successive lengths with their projecting portions in overlapping relation, and successively resistance welding said sections at the transverse and longitudinally abutting edges of the overlapping portions in a single operation throughout the length of overlap of the section.

HENRY S. HOLMES.